United States Patent
Lazarovich et al.

(10) Patent No.: US 8,314,588 B2
(45) Date of Patent: Nov. 20, 2012

(54) CONTROL SYSTEM FOR BATTERY CHARGE MAINTENANCE IN A POWER SYSTEM WITH MAIN AC GENERATOR CONTROL

(75) Inventors: David Lazarovich, Thornhill (CA); Ileana Rusan, Toronto (CA); Rodney Michalko, Ridgeville (CA)

(73) Assignee: Honeywell International Inc., Morristown, NJ (US)

( * ) Notice: Subject to any disclaimer, the term of this patent is extended or adjusted under 35 U.S.C. 154(b) by 403 days.

(21) Appl. No.: 12/621,404

(22) Filed: Nov. 18, 2009

(65) Prior Publication Data

US 2011/0115426 A1 May 19, 2011

(51) Int. Cl.
*H02J 7/00* (2006.01)
(52) U.S. Cl. ........................................ 320/107; 320/137
(58) Field of Classification Search .................... 320/107
See application file for complete search history.

(56) References Cited

U.S. PATENT DOCUMENTS

| | | | |
|---|---|---|---|
| 4,309,648 A | 1/1982 | Morishita | |
| 4,380,725 A | 4/1983 | Sherman | |
| 4,926,106 A * | 5/1990 | Tanis | 320/150 |
| 5,623,197 A | 4/1997 | Roseman et al. | |
| 5,672,954 A | 9/1997 | Watanabe | |
| 5,694,021 A * | 12/1997 | Morioka et al. | 320/106 |
| 5,754,414 A * | 5/1998 | Hanington | 363/21.12 |
| 7,439,634 B2 | 10/2008 | Michalko | |
| 8,008,804 B2 * | 8/2011 | Capp et al. | 307/44 |
| 2004/0174141 A1* | 9/2004 | Luz et al. | 320/132 |
| 2005/0077881 A1* | 4/2005 | Capp et al. | 322/29 |

* cited by examiner

*Primary Examiner* — Arun Williams
(74) *Attorney, Agent, or Firm* — Shimokaji & Assoc., PC

(57) ABSTRACT

An electrical power system may comprise an AC generator and a generator control unit (GCU) for varying AC output voltage of the AC generator. A DC bus may be connected to the AC generator via a Transformer Rectifier Unit (TRU) so that DC voltage on the DC bus is directly proportional to the AC output voltage. A battery may be connected directly to the DC bus. A control loop may be connected to receive battery current information and provide control signals to vary the AC output voltage so that battery charge may be maintained without battery damage.

16 Claims, 2 Drawing Sheets

CONTROL SYSTEM FOR BATTERY CHARGE MAINTENANCE IN A POWER SYSTEM WITH MAIN AC GENERATOR CONTROL

BACKGROUND OF THE INVENTION

The present invention generally relates to charging a battery and maintaining battery charge. More particularly, the present invention relates to battery charging and maintenance of battery charge in a power system that is primarily supplied power from an alternating current (AC) generator.

In some electrical power systems of vehicles such as aircraft or other aerospace vehicles, electrical power may be generated with an AC generator and then distributed to various electrical loads through distribution buses. Some loads may be AC loads and may receive power through an AC bus. Other loads may be direct current (DC) loads and may receive power through a DC bus. The DC bus may be provided with power through a transformer/rectifier unit (TRU) which may be connected to the AC bus.

A typical aircraft power system may be provided with one or more batteries which may also supply power to the DC bus. These batteries may be in various states of charge or discharge depending upon factors such as whether or not engine starting has occurred recently (in case of engine or APU electric start) or whether or not the batteries have been used for maintenance. The batteries may extract current from the DC bus at various rates for purposes of charging or maintaining charge. Typically, the batteries are not connected directly to the DC bus from which they receive charging current. They are instead interconnected to the DC bus with an intervening battery charging circuit or battery charger. The battery charger may control current flow to the batteries to assure that the batteries do not become overheated or otherwise damaged during charging.

In some aircraft power systems, the batteries may be connected to the DC bus without use of intervening battery chargers. In these systems, a specialized regulated transformer/rectifier unit (RTRU) may be employed to control voltage on the DC bus at a level that is suitable to assure that battery damage may be precluded during charging. Charging of a battery from a DC bus supplied by un-regulated TRU has heretofore been avoided due to bus voltage variations with amount of load connected to the bus leading therefore to deficient charging.

Dedicated battery chargers and/or specialized RTRU's may add to cost and weight of an aircraft.

As can be seen, there is a need to provide power from an AC generator for battery charging and maintenance of battery charge without use of dedicated battery chargers or specialized RTRU's.

SUMMARY OF THE INVENTION

In one aspect of the present invention, an electrical power system comprises: an AC generator; a generator control unit (GCU) for varying AC output voltage of the AC generator; a DC bus connected to the AC generator so that DC voltage on the DC bus is directly proportional to the AC output voltage; a battery connected directly to the DC bus; and a control loop connected to receive battery current information and provide control signals to vary the AC output voltage so that battery charge is maintained without battery damage.

In another aspect of the present invention, a method for operating an electrical power system comprises the steps of: generating AC power at a voltage that corresponds to an AC reference voltage; converting the AC power to DC power; applying the DC power to a DC bus; connecting a battery directly to the DC bus; charging the battery with a desired charging regimen; and varying the AC reference voltage to vary DC voltage on the DC bus so that the desired charging regimen is applied to the battery.

In still another aspect of the present invention, a method of maintaining charge on a battery in an aircraft comprises the steps of: connecting the battery directly to a DC bus of the aircraft; providing power to the DC bus from an AC generator of the aircraft; and varying output voltage of the AC generator responsively to battery charging requirements.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally may provide for controlling output voltage of an AC generator responsively to battery charging and battery charge maintenance requirements. AC bus voltage may be varied but controlled within specified voltage limits. The varying AC voltage may be applied to the DC bus (via the TRU) so that a resultant varying DC bus voltage may be suitable for battery maintenance. The DC bus may continue supplying power to other DC loads connected to the DC bus because the DC bus voltage may be maintained within specified voltage limits. Embodiments of the present invention may be particularly useful in vehicles such as aircraft.

Figure 1:
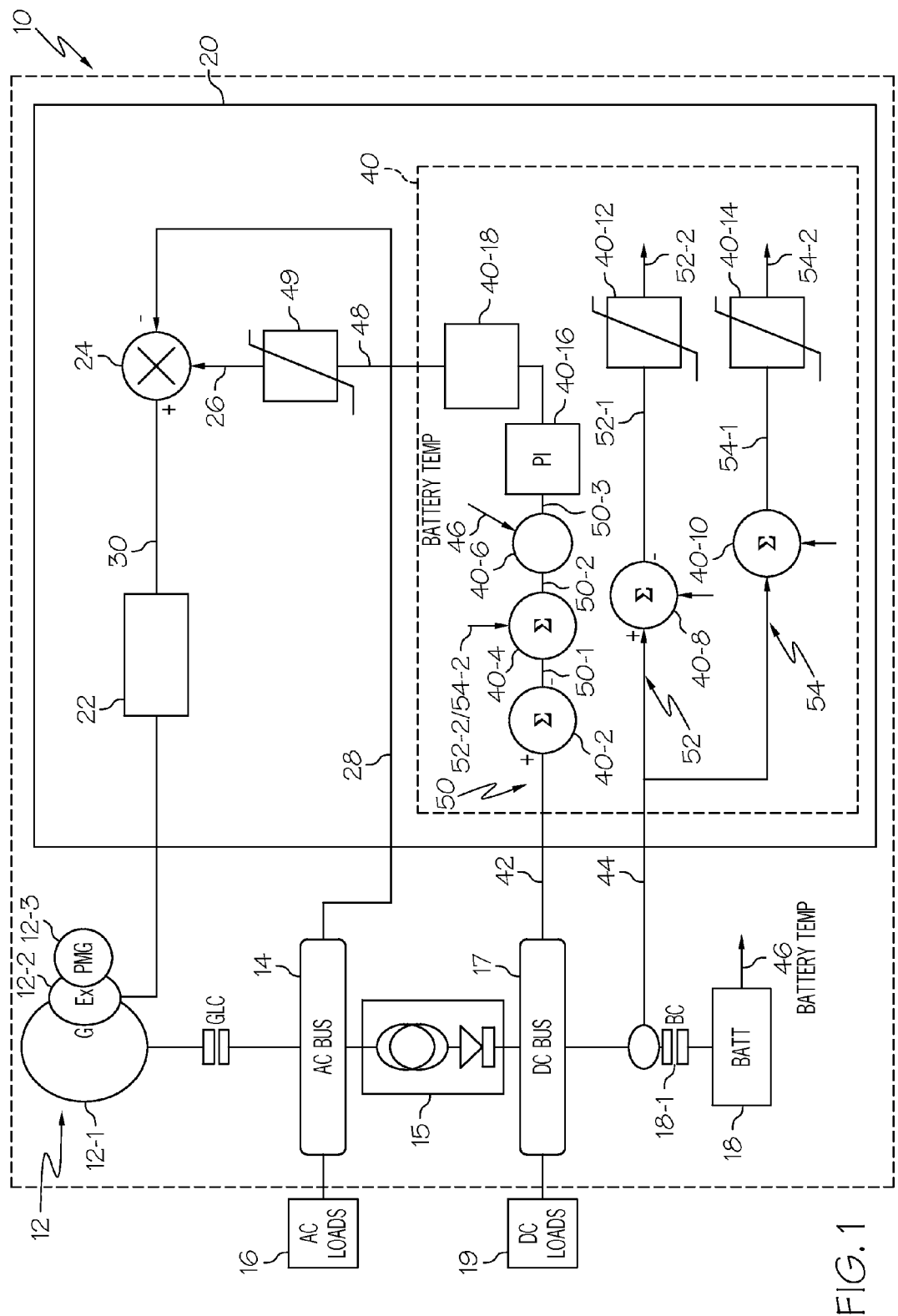
FIG. 1 is a schematic block diagram of an electrical power system in accordance with an embodiment of the present invention.

Referring now to FIG. 1, an exemplary embodiment of the invention may comprise an electrical power system 10 as shown in block diagram format. The system 10 may comprise an AC generator 12, an AC bus 14, a DC bus 17 and one or more batteries 18. The AC generator 12 may supply AC power to the AC bus 14. The AC bus 14 may be connected to a transformer/rectifier unit (TRU) 15 and to various AC loads, designated generally by the numeral 16. The TRU 15 may convert AC power to DC and provide DC power to the DC bus 17. The DC bus 17 may be connected to the batteries 18 through a battery contractor 18-1. The DC bus 17 may also be connected to various other DC loads designated generally by the numeral 19. It may be seen that the batteries 18 may be supplied with power from the AC generator 12 without any requirement that the power pass through an intervening battery charger (not shown) or specialized RTRU (not shown).

The AC generator 12 may comprise a conventional main generator 12-1, an exciter generator 12-2 and a permanent magnet generator 12-3. A generator control unit (GCU) 20 may regulate field current in the exciter 12-2 to control output voltage of the main generator 12. The GCU 20 may comprise a regulator 22 and a comparator 24. A reference voltage signal 26 may be supplied to the comparator 24 and compared to an AC bus voltage signal 28. The comparator 24 may produce an error signal 30 which may be supplied to the regulator 22. The regulator 22 may act responsively to the error signal 30 to adjust field current in the exciter 12-2 to maintain the AC bus voltage at the reference voltage.

The GCU 20 may also comprise a battery maintenance control loop 40. The control loop 40 may receive a DC bus voltage input signal 42, a battery current signal 44 and a battery temperature signal 46. The control loop 40 may produce a desired reference voltage signal 48. In operation, the GCU 20 may provide a varying reference voltage signal 26 to the comparator 24. The reference voltage signal 26 may vary as a function of battery maintenance requirements.

In operation, the control loop 40 may provide the desired reference voltage signal 48 as an input to a limiter 49. The limiter 49 may be programmed to limit the reference voltage 26 to a range that may be specified for a particular vehicle. For example, in some aircraft designs, the other AC loads 16 may be constructed to operate successfully at a voltage between 109 volts and 121 volts. In that case the limiter 49 may be programmed to limit the reference voltage 26 to 109 volts minimum and 121 volts maximum. On such an aircraft, the system 10 may be designed so that its batteries may be properly maintained when the AC bus voltage varies within the limited range of the varying reference voltage 26.

It may be noted that in a typical aircraft power system such as the system 10, electrical loading of the DC bus 17 may vary as a function of current requirement of the various loads 19 which may be connected to the DC bus 17 at any particular time. If the DC bus 17 were supplied with a constant AC voltage through the TRU 15, then these variations in DC loads 19 might produce load-induced variations in DC bus voltage. If the DC bus voltage were allowed to vary in a load-induced manner, then the DC bus voltage might not be suitable for battery charging and/or charge maintenance.

The system 10 may provide a DC bus voltage that continuously remains suitable for battery maintenance in spite of variations in DC bus loading. The reference voltage 26 may be varied to control output voltage of the AC generator 12. For example, the reference voltage 26 may be reduced so that DC current into the battery 18 may be limited to a constant value at a beginning of a charge process. In another exemplary operational condition of the system 10, battery discharge may be detected because DC loading may drop DC bus voltage below battery voltage. In that case, the output of the AC generator 12 may be increased (between allowed limits) in order to raise DC bus voltage and stop the battery discharge. In still another exemplary operational condition, an impedance increase of the battery may develop during charging of the battery 18. In that case, the AC generator 12 may be controlled so that its AC voltage output and a resultant DC bus voltage may be maintained at levels that may ensure that the battery 18 does not discharge.

An exemplary embodiment of the control loop 40 may comprise a DC bus voltage comparator 40-2, a battery adjustment comparator 40-4 and a battery temperature comparator 40-6. The comparators 40-2, 40-4 and 40-6 may be interconnected on a signal path 50. The control loop 40 may also comprise a battery maximum charge comparator 40-8 and a battery maximum discharge comparator 40-10. The comparator 40-8 may be positioned in a signal path 52 and the comparator 40-10 may be positioned in a signal path 54.

The DC bus voltage signal 42 may be provided to the comparator 40-2. A reference DC bus voltage may be programmed into the comparator 40-2, (e.g. 28 volts as shown in FIG. 1). The comparator 40-2 may continually compare actual DC bus voltage from the signal 42 with its programmed reference DC voltage and produce a desired voltage adjustment signal 50-1 on the signal path 50.

The battery current signal 44 may be provided to the comparator 40-8. A reference maximum battery charge current may be programmed into the comparator 40-8. The comparator 40-8 may continually compare actual battery current from the signal 44 with its programmed reference current and produce a desired voltage adjustment signal 52-1 on the signal path 52. Similarly the battery current signal 44 may be provided to the comparator 40-10. A reference maximum battery discharge current may be programmed into the comparator 40-10. The comparator 40-10 may continually compare actual battery current from the signal 44 with its programmed reference current and produce a desired voltage adjustment signal 54-1 on the signal path 54.

Limiters 40-12 and 40-14 may be provided on signal paths 52 and 54 respectively. The limiters 40-12 and 40-14 may limit a range of the adjustment signals 52-1 and 54-1 respectively so that the control loop 40 does not produce commands that may cause voltages in the system to exceed specified limits. Limited desired voltage adjustment signals 52-2 and 54-2 may emerge from the limiters 40-12 and 40-14 respectively.

The signals 52-2 and 54-2 may be provided as inputs to the battery adjustment comparator 40-4 which may be positioned on the signal path 50. The comparator 40-4 may compare the signal 50-1 from the DC bus voltage comparator 40-2 with the signal 52-2 and/or 54-4 to produce a first modified version of the signal 50-1, which first modified signal may be referred to as signal 50-2.

The battery temperature signal 46 may be provided to the battery temperature comparator 40-6. Based on a level of the signal 46, the comparator 40-6 may modify a charging algorithm so that when charging current starts decreasing below its constant prescribed value, the voltage of the DC bus is continuously trimmed to compensate for temperature variation. A resultant second modified version of the signal 50-1 may emerge fro the comparator 40-6, which second modified signal may be referred to as signal 50-3.

The signal 50-3 may be further processed in a conventional proportional controller 40-16 to assure that voltage variations may be performed in a stable manner. The signal 50-3 may then be provided to a translator 40-18 so that DC voltage information of the signal 50-3 may be translated into AC voltage information that may be used as the desired AC reference voltage signal 48. The signal 48 may be passed through the limiter 49 to produce the limited reference voltage signal 26. The GCU 20 may then employ the signal 26 as a reference voltage for controlling output voltage of the generator 12 as described hereinabove.

It may be seen that the system 10 may provide for safe and effective battery maintenance without use of a battery charger. For example, the system 10 may employ a conventional battery-charging regimen or algorithm which includes a Constant Current/Constant Voltage characteristic charging curve. Typically, a battery in a discharged or low state of charge may have low battery impedance so that at the beginning of the charging process charging current may tend to increase to values that may not be tolerated by the battery. The system 10 may regulate the output voltage of the AC generator 12 and thus limit charging current via a decrease of output voltage of the AC generator 12. The voltage on the DC bus 17 may be directly proportional to AC input voltage in the TRU 15. By operation of the control loop 40, output voltage of the AC generator 12 may decreased and charging current of the battery 18 may be kept at the desired constant value.

Conversely, increase in the amount of charge, may produce an increase of battery internal impedance. In order to maintain the constant charging current, the voltage output of the AC generator 12 may increase until a maximum voltage value allowed on the DC bus 17 is attained. Then the charging characteristic algorithm may transition from Constant Current to Constant voltage. In that mode the voltage output of the AC generator 12 may not increase any more and the charging current may decrease. Charging may continue while the output voltage of the AC generator 12 may be maintained at a constant value. Charging current of the battery 18 may decrease continuously as the battery 18 approaches its fully-charged state.

Figure 2:
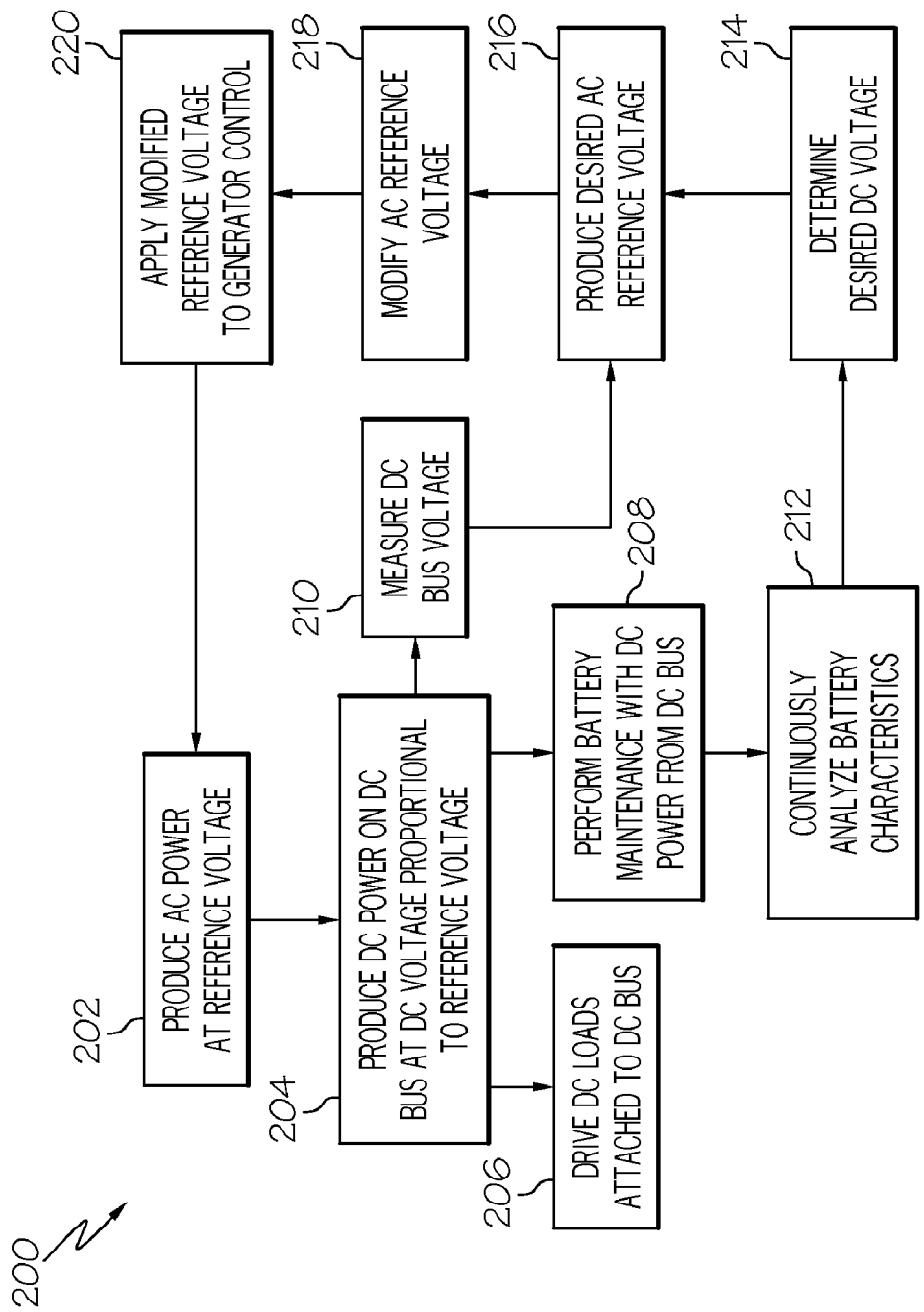
FIG. 2 is a flow chart of a method fro operating an electrical power system in accordance with an embodiment of the present invention.

In one embodiment of the present invention, a method is provided for operating an electrical control system in which battery charging may be performed. In that regard the method may be understood by referring to FIG. 2. In FIG. 2, a flow chart may portray various aspects of a method 200. In a step 202, AC power may be produced at a reference voltage (e.g., the generator 12 may produce AC power at an output voltage under control of the GCU 20). In step 204, DC power may be produced on a DC bus a DC voltage that is proportional to the reference voltage (e.g., the AC output voltage may be applied the AC bus 14 and the TRU 15 may convert AC bus voltage to DC voltage on the DC bus 17). In a step 205, DC loads may be operated from the DC bus (e.g., the DC loads 19 may be connected to and driven from the DC bus 17). In a step 208, a battery charge may be maintained with DC power supplied directly from the DC bus (e.g., the battery 18 may be connected directly to the DC bus 17 without any intervening battery chargers).

In a step 210, DC bus voltage may be measured (e.g., the DC bus voltage signal 42 may be applied to the control loop 40). In a step 212, battery characteristic may be continuously analyzed (e.g., the battery current signal 44 may be applied to the control loop 40). In a step 214 a desired DC bus voltage may be determined (e.g., the comparators 40-8 and 40-10 and limiters 40-12 and 40-14 may produce signals 52-2 and 54-2, which signals may be employed in the comparator 40-4 to produce the first modified DC voltage adjustment signal 50-2). In a step 216, a desired AC reference voltage may be generated by combining data produced in steps 210 and 214 (e.g., the signal 50-2 or 50-3 may be translated into an AC reference voltage by the translator 40-18). In a step 218, the AC reference voltage may be modified (the signal 26 may be applied to the comparator 24). In a step 220, the AC generator output voltage may be varied to be consistent with the reference voltage applied in step 218.

It should be understood, of course, that the foregoing relates to exemplary embodiments of the invention and that modifications may be made without departing from the spirit and scope of the invention as set forth in the following claims.

We claim:

1. An electrical power system comprising:
   an AC generator;
   a generator control unit (GCU) for varying AC output voltage of the AC generator;
   a DC bus connected to the AC generator so that DC voltage on the DC bus is directly proportional to the AC output voltage;
   a battery connected directly to the DC bus; and
   a control loop connected to receive battery current information and provide control signals to vary the AC output voltage so that battery charge is maintained without battery damage, wherein the control loop comprises:
   a DC bus voltage comparator connected to compare DC voltage on the DC bus with a reference DC voltage and to produce a DC bus voltage correction signal;
   a battery adjustment comparator interconnected with the DC bus voltage comparator to compare the DC bus voltage correction signal with battery charging current data and produce a first modified DC bus voltage correction signal; and
   wherein the GCU is connected to vary the AC output voltage responsively to the first modified DC bus voltage correction signal.

2. The electrical power system of claim 1 further comprising an AC bus for distributing AC power from the AC generator to the DC bus and to other AC loads.

3. The electrical power system of claim 2 further comprising a limiter for limiting variation of AC output voltage to a range that is suitable for the other AC loads.

4. The electrical power system of claim 1 wherein:
   the GCU is connected to control the AC output voltage responsively to a reference voltage; and
   the control loop is connected to produce signals to vary the reference voltage.

5. The electrical power system of claim 1 wherein the control loop further comprises:
   a battery maximum charge comparator connected to compare a battery current signal with a reference battery maximum charge current and produce a first battery charging current data signal to the battery adjustment comparator;
   a battery maximum discharge comparator connected to compare a battery current signal with a reference battery maximum discharge current and produce a second battery charging current data signal to the battery adjustment comparator.

6. The electrical power system of claim 5 further comprising limiters positioned between the battery maximum charge comparator and the battery adjustment comparator and between the battery maximum discharge comparator and the battery adjustment comparator.

7. The electrical power system of claim 1 wherein the control loop comprises:
   a battery temperature comparator interconnected with the battery adjustment comparator to compare the first modified DC bus voltage correction signal with battery temperature data and produce a second modified DC bus voltage correction signal.

8. The electrical power system of claim 1 further wherein the DC bus is connected to DC loads other than the battery.

9. The electrical power system of claim 1 wherein:
   the comparator is connected to receive AC output voltage information and compare the AC output voltage information with a reference voltage signal; and
   the comparator is interconnected with the control loop so that the reference voltage signal is varied as a function of battery charging requirement.

10. A method for operating an electrical power system comprising the steps of:
    generating AC power at a voltage that corresponds to an AC reference voltage;
    converting the AC power to DC power;
    applying the DC power to a DC bus;
    connecting a battery directly to the DC bus;
    charging the battery with a desired charging regimen;
    comparing DC voltage on the DC bus with a reference DC voltage to produce a DC bus voltage correction signal;

comparing the DC bus voltage correction signal with battery charging current data and produce a modified DC bus voltage correction signal; and varying the AC reference voltage based on the modified DC bus voltage correction signal to vary DC voltage on the DC bus so that the desired charging regimen is applied to the battery.

11. The method of claim 10 further comprising the step of connecting varying DC loads to the DC bus so that DC current on the bus varies.

12. The method of claim 10 wherein the step of charging the battery with a desired regimen comprises charging the battery with a varying voltage so that a constant-current charging of the battery is performed irrespective of any changes in battery impedance.

13. The method of claim 10 further comprising the steps of:
applying the AC power to an AC bus prior to converting the AC power to DC power;
connecting AC loads to the AC bus; and
controlling variations of AC voltage on the AC bus to a range of voltages that are suitable for operation of the AC loads.

14. The method of claim 10 wherein the AC reference voltage is varied as a function of battery charging current.

15. The method of claim 10 wherein the AC reference voltage is varied as a function of temperature of the battery.

16. A method of maintaining charge on a battery in an aircraft comprising the steps of:
connecting the battery directly to a DC bus of the aircraft;
providing power to the DC bus from an AC generator of the aircraft; and
varying output voltage of the AC generator responsively to battery charging requirements, wherein the step of varying the output voltage comprises:
varying a reference voltage of a generator control unit (GCU) of the aircraft,
comparing DC voltage on the DC bus to a reference DC voltage,
producing a DC bus voltage correction signal,
employing the DC bus voltage correction signal as a parameter for varying the reference voltage,
comparing the DC bus voltage correction signal DC voltage to a battery charging current signal and producing a first modified DC bus voltage correction signal,
comparing the first modified DC bus voltage correction signal DC voltage to a battery temperature signal and producing a second modified DC bus voltage correction signal, and
employing the second modified DC bus voltage correction signal as a parameter for varying the reference voltage.

\* \* \* \* \*